United States Patent [19]

Chiang

[11] Patent Number: 5,423,983

[45] Date of Patent: Jun. 13, 1995

[54] OIL FILTER WITH A MAGNETIC UNIT

[76] Inventor: Jean Chiang, 6th Fl., No. 55, Sec. 2, Chunghsiao Rd., Sanchung City, Taipei County, Taiwan, Prov. of China

[21] Appl. No.: 193,415

[22] Filed: Feb. 7, 1994

[51] Int. Cl.$^6$ ............................................. B01D 35/06
[52] U.S. Cl. ..................................... 210/223; 184/6.25
[58] Field of Search ........................ 210/223; 184/6.25

[56] References Cited

U.S. PATENT DOCUMENTS

| | | | |
|---|---|---|---|
| 3,342,339 | 9/1967 | Riolo | 210/223 |
| 3,887,469 | 6/1975 | Hayashi | 210/223 |
| 5,009,779 | 4/1991 | Hebert | 210/223 |
| 5,228,990 | 7/1993 | Chiang | 210/223 |

Primary Examiner—Matthew O. Savage
Attorney, Agent, or Firm—Watson, Cole, Grindle & Watson

[57] ABSTRACT

An oil filter includes a housing, a cylindrical sieve mounted in the housing, a filter medium disposed between the housing and the cylindrical sieve, and an end cap having a central outlet port through which filtered oil passes and a plurality of peripheral inlet ports through which oil to be filtered enters. At least one magnet unit is amounted in the cylindrical sieve and is attached to a peripheral wall of the cylindrical sieve. The magnet unit includes a container having a plurality of openings in a periphery thereof and a magnet member accommodated in the container.

1 Claim, 3 Drawing Sheets

5,423,983

OIL FILTER WITH A MAGNETIC UNIT

BACKGROUND OF THE INVENTION

1. Field of the Invention

The present invention relates to an improved oil filter with a magnetic unit capable of removing micron metallic particles, and, more particularly, such magnetic unit having a container capable of receiving excessive micron metallic particles.

2. Description of Related Art

U.S. Pat. No. 5,228,990 issued on Jul. 20, 1993 to the present applicant discloses an oil filter which is capable of removing micron metallic particles. It is, however, found that the ferrous particles which have been attracted by and thus adhered to the magnets of such an oil filter may fall and thus reenter the engine when subjected to thrust from the flowing oil, especially in the case that a certain amount of ferrous particles have been adhered to the magnets.

The present invention provides an improved oil filter to mitigate and/or obviate the above-mentioned problem.

SUMMARY OF THE INVENTION

The present invention provides an oil filter which includes a housing which defines a first opening, an end cap sealing mounted to the first opening of the housing and defining a central outlet port and a plurality of peripheral inlet ports, a cylindrical sieve mounted in the housing so as to define an inner chamber therewithin and an outer chamber between the cylindrical sieve and the housing in which the outlet port of the end cap communicates with the inner chamber and the inlet ports of the end cap communicates with the outer chamber, a filter medium disposed in the outer chamber, and at least one magnet unit mounted in the inner chamber and attached to a peripheral wall of the cylindrical sieve. The magnet unit includes a container having a plurality of openings in a periphery thereof and a magnet member accommodated in the container.

By such an arrangement, oil to be filtered enters the outer chamber via the inlet ports, passes through the filter medium, the cylindrical sieve, and the container, and then exits the outlet port of the end cap such that micron ferric particles contained in the oil are retained by the magnet member and filtered from the oil. Micron ferric particles which should fall due to the impact from the flowing oil are gathered in the container.

In one embodiment of the present invention, the magnet member includes a stub formed on each of upper and lower ends thereof and the container is made from a plate. The plate includes two foldable side plates respectively extending from both sides thereof and an insert plate extending outwardly from each of upper and lower ends thereof, each insert plate including a hole therein for receiving an associated stub of the magnet member, each side plate including a foldable corner plate extending from each of two ends thereof, and the plate and side plates including a plurality of openings through which oil flows.

Other objects, advantages, and novel features of the invention will become more apparent from the following detailed description when taken in conjunction with the accompanying drawings.

DESCRIPTION OF THE PREFERRED EMBODIMENT

Figure 1:
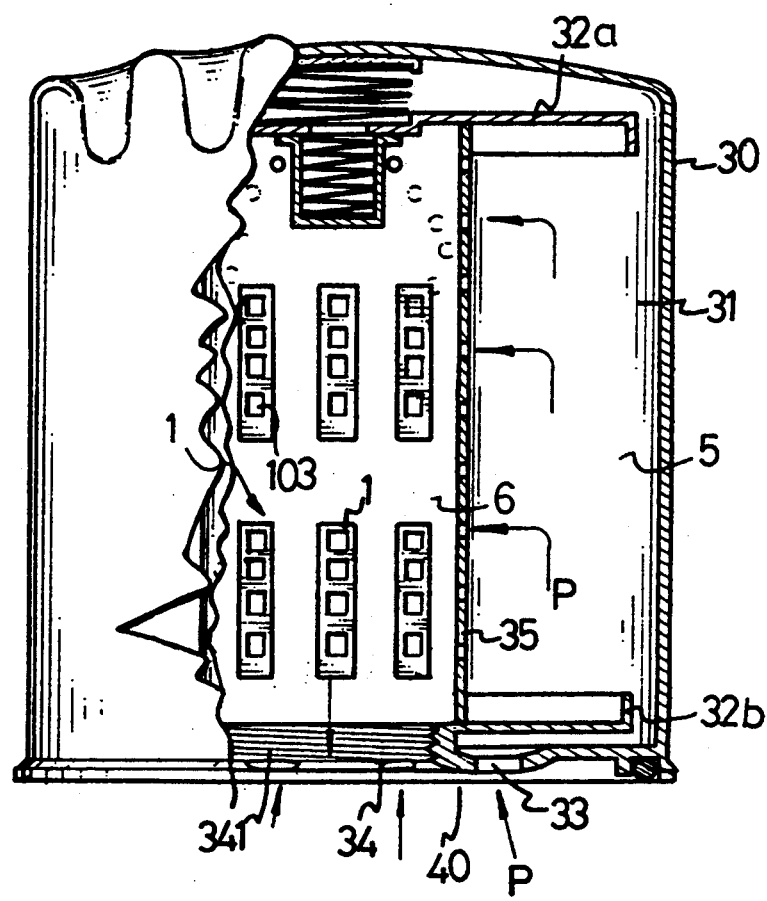
FIG. 1 is a side elevational view, partly sectioned, of an oil filter in accordance with the present invention.

Referring to the drawings and initially to FIG. 1, an oil filter in accordance with the present invention generally includes a housing 30, a cylindrical sieve 35 received in the housing 30 and securely held by upper and lower caps 32a and 32b, a filter medium 31 disposed in an outer chamber 5 defined by the cylindrical sieve 35 and the housing 30, and an end cap 40. As disclosed in U.S. Pat. No. 5,228,990, the end cap 40 is removably and sealingly mounted to a lower opening (not labeled) of the housing 30 by threads 341 and has a central outlet port 34 through which filtered oil exits and a plurality of peripheral inlet ports 33 through which oil to be filtered enters.

Figure 4:
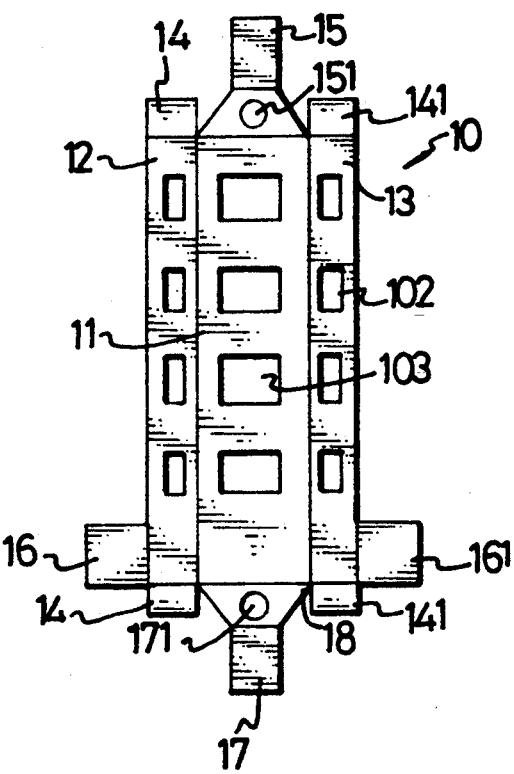
FIG. 4 is a flattened plan view of a container of the magnetic unit.
Figure 3:
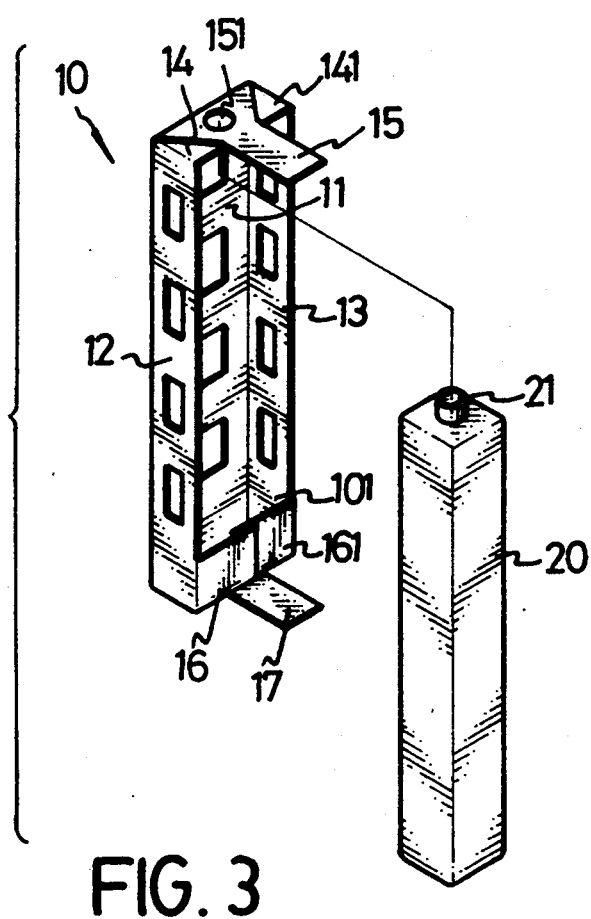
FIG. 3 is an exploded view of the magnetic unit in FIG. 2.
Figure 2:
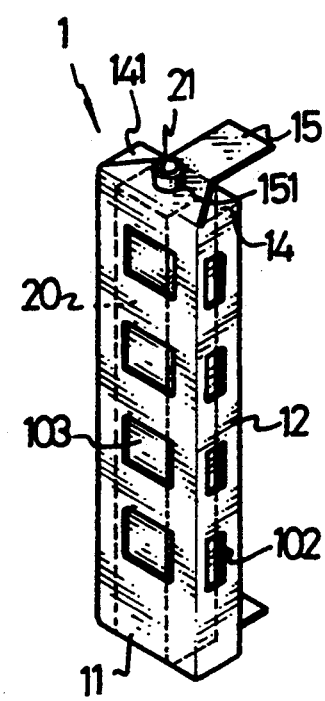
FIG. 2 is a magnetic unit of the oil filter in accordance with the present invention.

The oil filter further includes at least one magnet unit 1 accommodated in an inner chamber 6 defined by the cylindrical sieve 35. As shown in FIGS. 2 and 3, the magnetic unit 1 includes a container 10 and a magnetic member 20 accommodated in a compartment defined by the container 10. Still referring to FIG. 3 and further to FIG. 4, the container 10 may be formed by folding a plate 11. The plate 11 includes two foldable side plates 12 and 13 respectively extending from both sides thereof. Four foldable corner plates 14 and 141 respectively extend from each of the ends of the side plates 12 and 13. A pair of foldable insert plates 15 and 17 respectively extend outwardly from upper and lower ends of the plate 11 in which a portion of the lower insert plate 17 forms a bottom plate 18 of the container 10 after folding. Each of the insert plates 15 and 17 includes a hole 151, 171 therein for respectively receiving a stub 21 extending from each of upper and lower ends of the magnet member 20. Plates 11, 12, and 13 include a plurality of openings 102, 103 through which oil flows. An extension 16, 161 projects laterally from the side plates 12, 13 respectively to define a space for receiving micron ferric particles.

Figure 5:
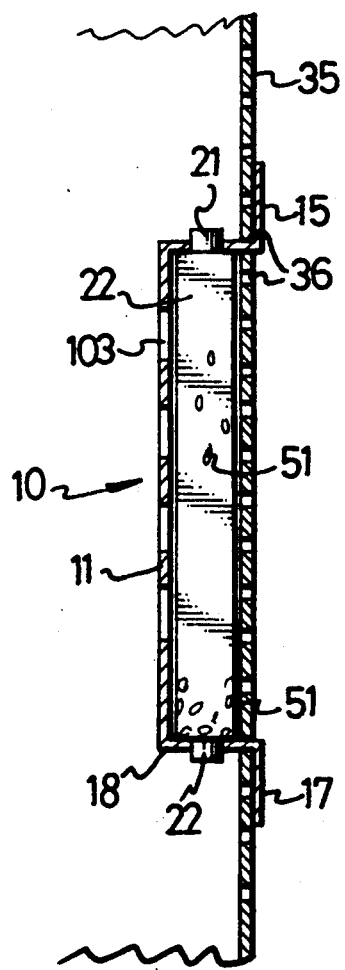
FIG. 5 is a partial cross-sectional view illustrating attachment of the magnetic view to the cylindrical sieve of the oil filter.

As shown in FIG. 5, the container 10 which is formed after folding securely holds the magnet member 20 and is attached to the peripheral wall of the cylindrical sieve 35 by means of passing the insert plates 15 and 17 through correspondingly defined slots 36 in the peripheral wall of the cylindrical sieve 35 and then folding the insert plates 15 and 17. It is appreciated that other suitable container structure and attachment means thereof can be used without departing from the scope of the invention.

In use, the oil to be filtered enters the chamber 5 of the housing 30 via the peripheral inlet ports 33 and then passes through the filter medium 31, the cylindrical sieve 35, and then exits the outlet port 34 of the end cap 40, as indicated by arrows P. Micron ferric particles 51 contained in the oil are attached by the magnet member 20. The micron ferric particles which have been adhered to the magnet member 20 are kept in the container 10 even though they are subjected to the thrust from the flowing oil.

Although the invention has been explained in relation to its preferred embodiment, it is to be understood that many other possible modifications and variations can be made without departing from the spirit and scope of the invention as hereinafter claimed.

I claim:
1. An oil filter comprising:
a housing which defines a first opening;
an end cap sealingly mounted to said first opening, said end cap defining an outlet port centrally located therein and a plurality of inlet ports spaced from and surrounding said outlet port;
a cylindrical sieve including a peripheral wall having a plurality of slots and mounted in said housing so as to define an inner chamber therewithin and an outer chamber between said cylindrical sieve and said housing, said outlet port of said end cap communicating with said inner chamber and said plurality of inlet ports of said end cap communicating with said outer chamber;
a filter medium disposed in said outer chamber;
at least one magnet unit mounted in said inner chamber, said magnet unit comprising:
a magnet member including a stub formed on each of upper and lower ends thereof;
a container including a plate having two foldable side plates respectively extending from both sides thereof and an insert plate extending outwardly from each of upper and lower ends thereof, each said insert plate including a hole therein for receiving associated said stub of said magnet member and thereby accommodating said magnet member in the container, each side plate including a foldable corner plate extending from each of two ends thereof, said plate and said side plates including a plurality of openings through which oil flows, each said insert plate being inserted through corresponding slots in the peripheral wall of the cylindrical sieve and thereby attaching the magnet unit onto the peripheral wall of the cylindrical sieve;
whereby oil to be filtered enters said outer chamber via said inlet ports, passes through said filter medium, said cylindrical sieve, and said container, and then exits said outlet port of said end cap such that micron ferric particles contained in the oil are retained by said magnet member and filtered from the oil and excessive micron ferric particles are retained in said container.

* * * * *